United States Patent
Feinbloom

[19]

[11] Patent Number: 5,822,048
[45] Date of Patent: Oct. 13, 1998

[54] FLIP-UP RANGE FINDER DEVICE

[75] Inventor: Richard E. Feinbloom, New York, N.Y.

[73] Assignee: Designs for Vision, Inc., Ronkonkoma, N.Y.

[21] Appl. No.: 706,563

[22] Filed: Sep. 5, 1996

[51] Int. Cl.[6] ............... G01C 3/00; G01C 3/22; A63B 57/00; A45B 3/08
[52] U.S. Cl. ............... 356/21; 33/707; 473/131; 356/3
[58] Field of Search ............... 356/21, 3; 33/706, 33/707, 700, 701; 473/131

[56] References Cited

U.S. PATENT DOCUMENTS

| | | |
|---|---|---|
| D. 243,867 | 3/1977 | Williams, Jr. . |
| D. 244,435 | 5/1977 | Wolfe . |
| D. 247,452 | 3/1978 | Kitay . |
| 399,853 | 12/1889 | Landon ............... 356/21 |
| 1,980,101 | 11/1934 | Schneider . |
| 2,253,948 | 8/1941 | Brown ............... 33/252 |
| 2,352,644 | 7/1944 | Linderman, Jr. et al. . |
| 3,109,654 | 11/1963 | Comitz . |
| 3,156,211 | 11/1964 | Mallory, Jr. . |
| 4,672,194 | 6/1987 | Kastendieck et al. . |
| 4,696,111 | 9/1987 | Gardner ............... 33/262 |
| 4,839,926 | 6/1989 | Choi . |
| 4,906,825 | 3/1990 | Wu . |
| 4,985,935 | 1/1991 | Hur . |
| 5,007,110 | 4/1991 | Gilbert . |
| 5,020,902 | 6/1991 | Heyningen et al. ............... 356/21 |
| 5,046,839 | 9/1991 | Krangle . |
| 5,128,807 | 7/1992 | Blackmon . |
| 5,211,395 | 5/1993 | Liao . |
| 5,311,271 | 5/1994 | Hurt et al. . |
| 5,538,250 | 7/1996 | Putz ............... 473/210 |
| 5,616,903 | 4/1997 | Springer ............... 356/21 |

*Primary Examiner*—Stephen C. Buczinski
*Attorney, Agent, or Firm*—Plevy & Associates

[57] ABSTRACT

A range finder for a cap for determining the distance to a golf flag. The range finder has a cap coupling portion having a thin shell portion adapted to conform with the cap and a pair of "u" shaped portions for hooking around an edge of the cap. A base is carried by the cap coupling portion. A first support is pivotally mounted to the base at a first pivot point. A lens is carried by the first support. A second support is pivotally mounted to the base at a second pivot point. An index for viewing through the lens is pivotally carried by the second support. The range finder has a linkage bar pivotally mounted at a third pivot point to the first support and pivotally mounted at a fourth pivot point to the second support. Moving the lens from a retracted position to a flipped down, in use position moves the index in unison.

19 Claims, 7 Drawing Sheets

FLIP-UP RANGE FINDER DEVICE

FIELD OF THE INVENTION

The invention relates to a range finder device and more particularly to a flip-up range finder device for determining the distance to the flag on a golf course.

BACKGROUND OF THE INVENTION

In the play of golf, the object is to place a golf ball into a hole in as few strokes as possible. The hole, which is located on a green, is marked with a flag, also referred to as a stick or pin. The golfer selects the desired club to hit the ball towards the hole based on several factors including the type of surface upon which the ball sits (i.e., the fairway, rough, or bunker), and the distance the ball is from the hole.

As is readily known by golfers, the remaining distance to the flag can be determined by referring to permanent distance markers set out along the fairway. These yardage markers are generally set at some yard increments, including a marker at 150 yards. The golfer is therefore required to interpolate or estimate his or her exact location. Furthermore, these fixed yardage markers do not account for variations in the placement of the hole on the green; the hole placement is varied on the green both for increased interest for the golfer who plays the same course often and to reduce wear and tear on the green.

There exist devices which the golfer can carry with her or him to determine the distance to the hole. It is recognized that by comparing the relative height, as viewed by the golfer, of two objects of known height, when the distance to the first object is known, the distance to the second object can be determined. Referring to FIG. 1, the height ($h_f$) of the flag is a known height, typically seven (7) feet. A range finder device is placed a known distance ($d_{rf}$) in front of the golfer's eye. The distance to the flag (d) can be determined by positioning the flag pole as seen between spaced marks, defining a known height ($h_{rf}$), on the range finder device and reading the distance ($d_f$) to the flag. The determination is based on a ratio using similar triangles $$d_f = \frac{h_f d_{rf}}{h_{rf}}$$

U.S. Pat. No. 5,211,395 discloses a golf tool which includes a range-finder that works similar to the method described above. One of the problems of previous range-finders is that the range-finder needs to be stored in the golf bag or elsewhere between uses and the golfer is less likely to use the range-finder if the golfer has to pull it out every time she or he wants to use it.

It is desired to have a range finder that is both readily accessible and stores conventionally.

SUMMARY OF THE INVENTION

The invention is directed to a range finder carried on a cap for determining the distance to a golf flag. The range finder has a cap coupling portion having a thin shell portion adapted to conform with the cap and a pair of "u" shaped portions for hooking around an edge of the cap. A base is carried by the cap coupling portion. A first support is pivotally mounted to the base at a first pivot point. A lens is carried by the first support. A second support is pivotally mounted to the base at a second pivot point. An index for viewing through the lens is pivotally carried by the second support. The range finder has a linkage bar pivotally mounted at a third pivot point to the first support and pivotally mounted at a four pivot point to the second support. Moving the lens from a retracted position to a flipped-down, in use position moves the index in unison.

In a preferred embodiment, one of the supports has a stop portion for limiting the movement of the linkage bar in one direction and the other support has a stop portion for limiting the movement of the linkage bar in the other direction.

Further objects, features, and advantages of the present invention will become more apparent to those skilled in the art as the nature of the invention is better understood from the accompanying drawings and detailed descriptions.

BRIEF DESCRIPTION OF THE DRAWINGS

For the purpose of illustrating the invention, there is shown in the drawings a form which are presently preferred; it being understood, however, that this invention is not limited to the precise arrangements and instrumentalities shown.

DETAILED DESCRIPTION OF THE PREFERRED EMBODIMENTS

Figure 1:
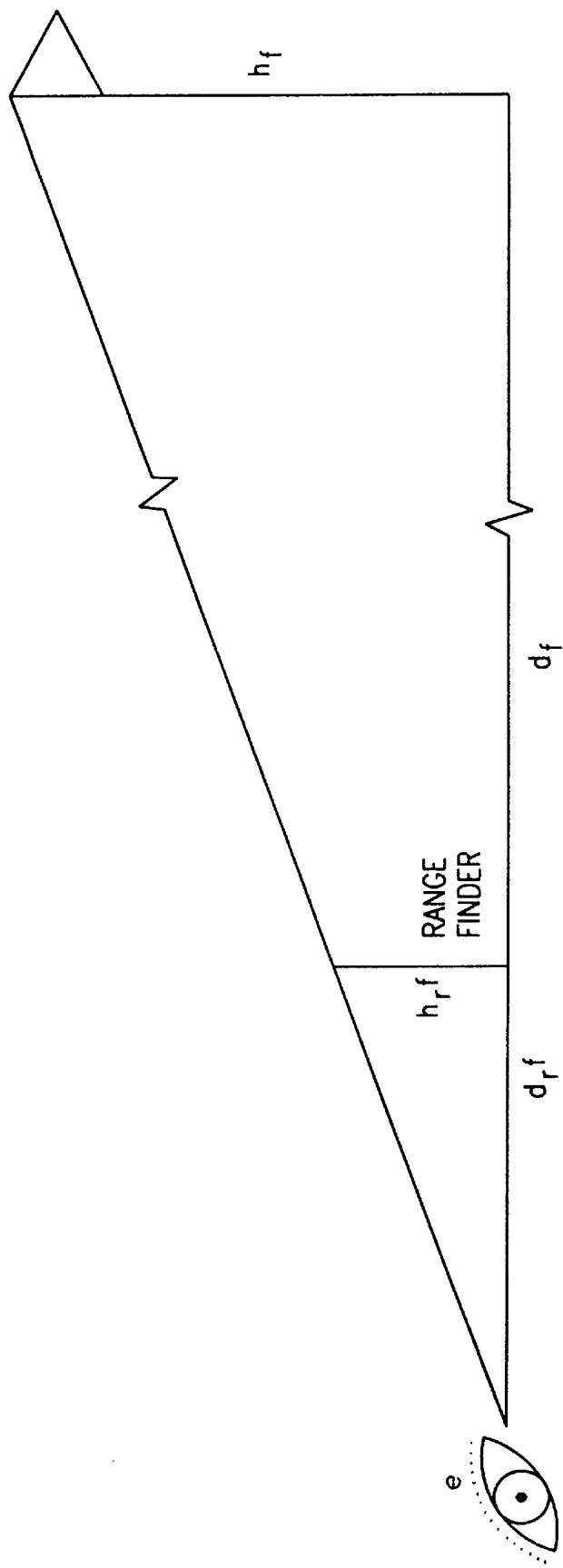
FIG. 1 is a schematic view of the relationship of a range finder to a golf hole and a flag, and an eye of the golfer.
Figure 2:
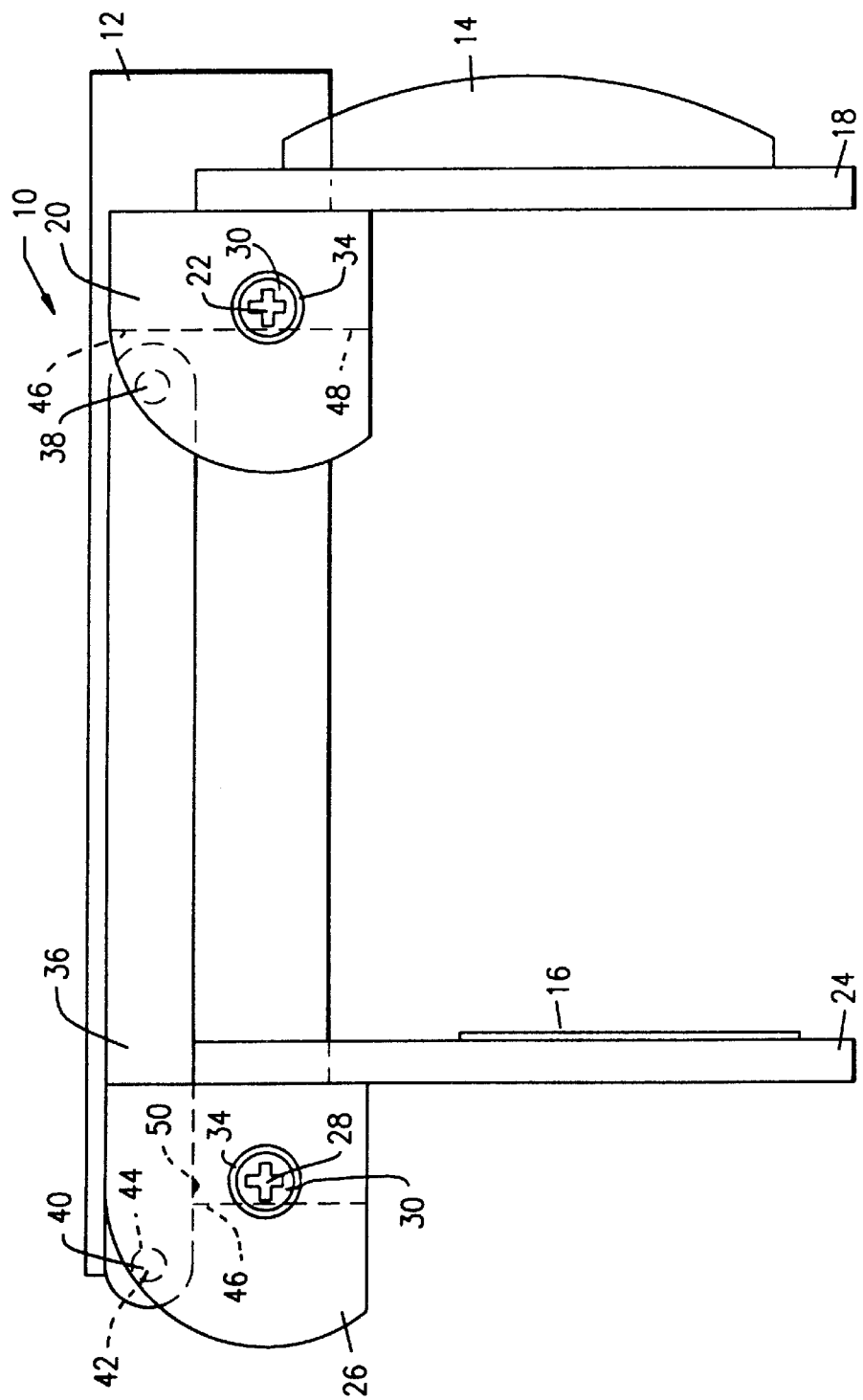
FIG. 2 is a side elevation view of a flip-up range finder according to the invention.

Referring now to the drawings, wherein like numerals indicate like elements, there is illustrated in FIG. 2 a side view of a flip-up range finder in accordance with the present invention designated generally as 10.

Referring to FIG. 2, the flip-up range finder 10 has a base 12, a lens 14, and a range finder index 16. The lens 14 is mounted to a transparent plate 18, which is secured to a support 20. The support 20 is pivotally mounted to the base 12 at a pivot point 22. In a preferred embodiment, the lens 14 is a Plano-convex lens.

The range finder index 16 is carried on a second transparent plate 24, which is secured to a second support 26. The support 26 is pivotally mounted to the base 12 at a pivot point 28. In a preferred embodiment, the range finder 16 is imprinted directly on the transparent plate 24 as best seen in FIG. 3A. It is recognized that the portion of the transparent plate 24 having the range finder 16 could be frosted.

In a preferred embodiment, both of the supports 20 and 26 are pivotally mounted at their respective pivot points 22 and 28 by a fastener 30, such as a screw, which extends through a hole in the support and is received by the base 12. A washer 34 encircles the fastener 30.

Figure 4:
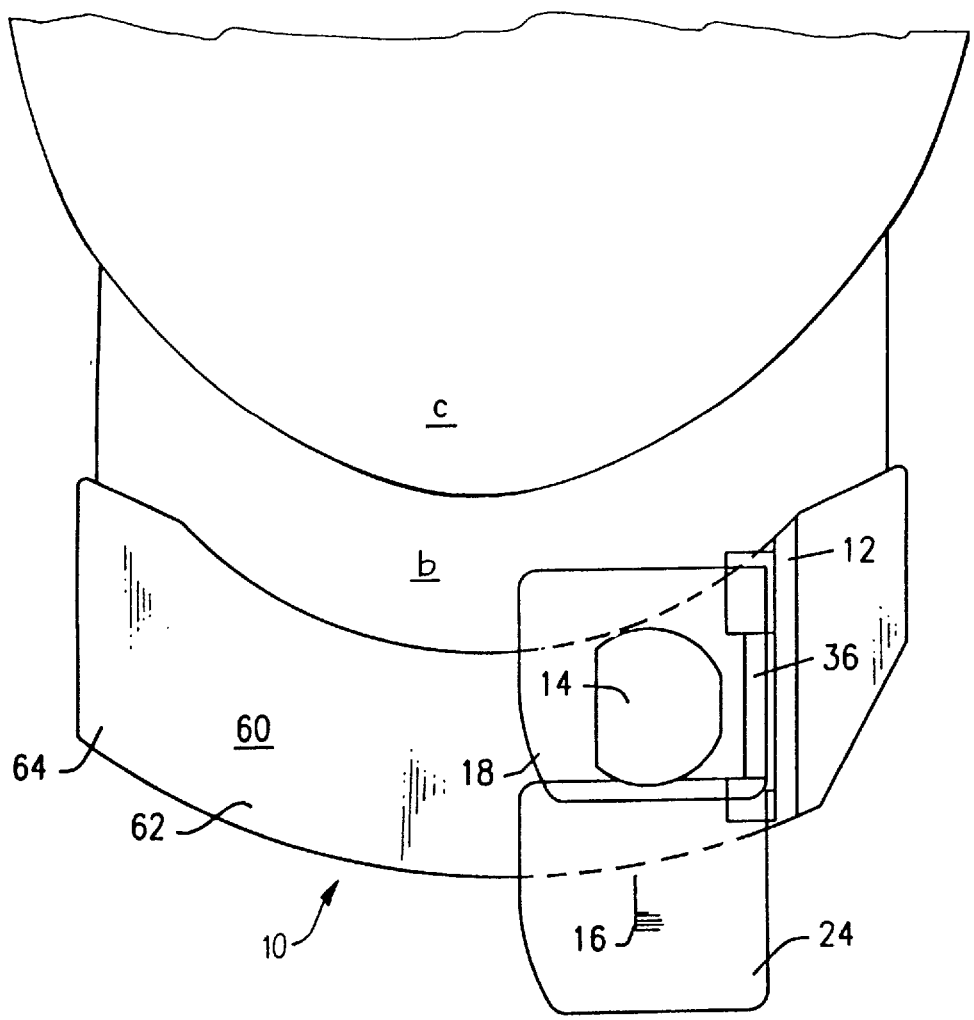
FIG. 4 is a bottom view of the flip-up range finder attached to a cap and in a flipped-up position.

Still referring to FIG. 2, the flip-up range finder 10 has a linkage arm 36. One end of the linkage arm 36 is pivotally mounted at pivot point 38 to the support 20. The other end of the linkage arm 36 is pivotally mounted at pivot point 40 to the second support 26. In a preferred embodiment, the supports 20 and 26 each have a pin 42 which extends into a respective hole 44 in the linkage arm 36 to define the respective pivot points 38 and 40. The movement of the lens 14 from a retracted position, as seen in FIG. 4, to a flipped-down, in use position, as seen in FIG. 2, results in the range finder index 16 moving concurrently because of the linkage arm 36.

The supports 20 and 26 each have a notch 46, shown in hidden line, from which the pin 42, which is received by the hole 44 in the linkage arm 36, extends. The linkage arm 36 is generally interposed between the supports 20 and 26 and the base 12. The notch 46 on the support 20 is generally rectangular and defines a surface 48 which the linkage arm 36 engages to define the retracted position as seen in FIG. 4. The notch 46 on the support 26 is shown as being generally "L" shaped and defines a surface 50 which the linkage arm 36 engages to define the in use position as seen in FIG. 2. It is recognized that the notch 46 in the support 26 could likewise be generally rectangular dependent on the pin 42 positioning, the surface 50 positioning, and the linkage arm 36.

Figure 3:
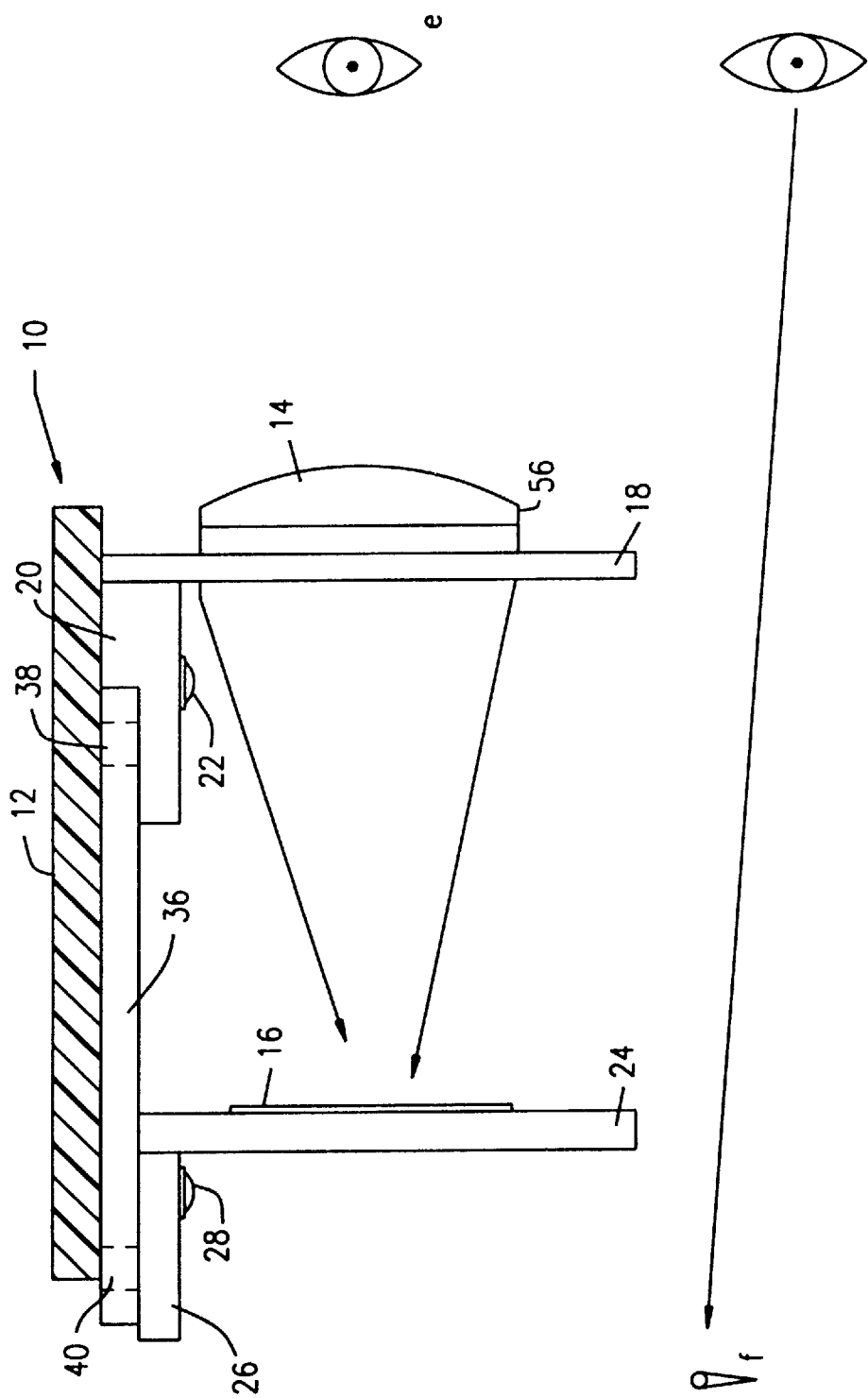
FIG. 3 is a top view of the flip-up range finder with a golfer and a flagpole shown schematically.
Figure 3A:
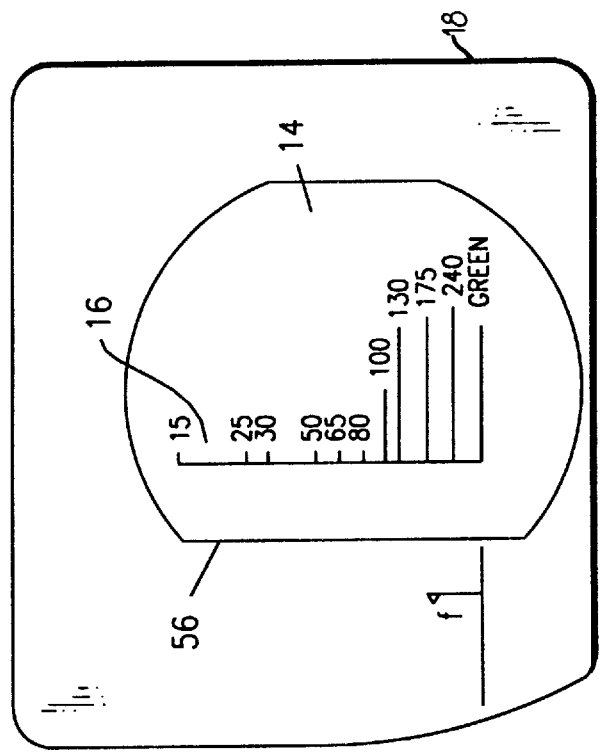
FIG. 3A is a view through the flip-up range finder as seen by the golfer.

A top view of the flip-up range finder 10 is seen in FIG. 3. The linkage arm 36 is connected to each of the supports 20 and 26 at the pivot points 38 and 40. Each of the supports are mounted to the base 12 at their respective pivot points 22 and 28. The transparent plates 18 and 24 are secured to the supports 20 and 26. In a preferred embodiment, the transparent plates are secured to the supports by an adhesive.

The golfer, represented by a pair of eyes (e) in FIG. 3, looks through the lens 14 and the transparent plate 18 with one eye at the range finder index 16 mounted to the second transparent plate 24. The lens 14 has a segment removed, thereby defining a chord surface 56. The golfer simultaneously looks at a flag (f) or stick with the other eye. The golfer's brain merges the images.

Referring to FIG. 3A, the range finder index 16, which is viewed through the lens 14, has a line defining the base, and a series of lines indicating distances. The golfer moves the flip-up range finder 10 relative to the flag, as explained below, such that the green, the bottom of the flag, is aligned with the bottom line, the line labeled green on the range finder index 16. The flag f is not viewed through the lens 14.

The golfer compares the top of the flag with lines to determine the distance to the flag and the hole. In FIG. 3A, the flag is approximately 65 yards away. The lines on the range finder index 16 are positioned based on the apparent distance of the range finder index 16 from the golfer's eye (e). The lens focus on the grid 16 to produce a collimated image of scale 16 viewed at the green. The other eye has no obstruction and views the green directly. The golfer's brain merges the images and hence the golfer sees the image of the flag (f) adjacent the range finder index 16. Because of the lens magnification, the range finder index 16 appears to be located further from the golfer that the range finder index's actual location to the golfer's eye.

In a preferred embodiment, the lens 14 is positioned 2.5 inches from the range finder index 16. The lens has a maximum thickness ($t_{max}$) of 3.95 mm and minimum thickness ($t_{min}$) of 2.38 mm. The convex side is a hyperbolic asphere defined by $$Z = \frac{CR^2}{1 + \sqrt{1 - (1+K)C^2R^2}}$$

where C=−0.0319057 and K=−1.729447 and R is the radial coordinates in millimeter. In another preferred embodiment, the lens is positioned 1.5 inches from the range finder index. The lens has approximately 25 dioptors and has a radius of 18 mm on the convex side. In both cases, the lens is spaced from the eye, as described below, generally the same distance as the lens is spaced from the range finder index.

Figure 3B:
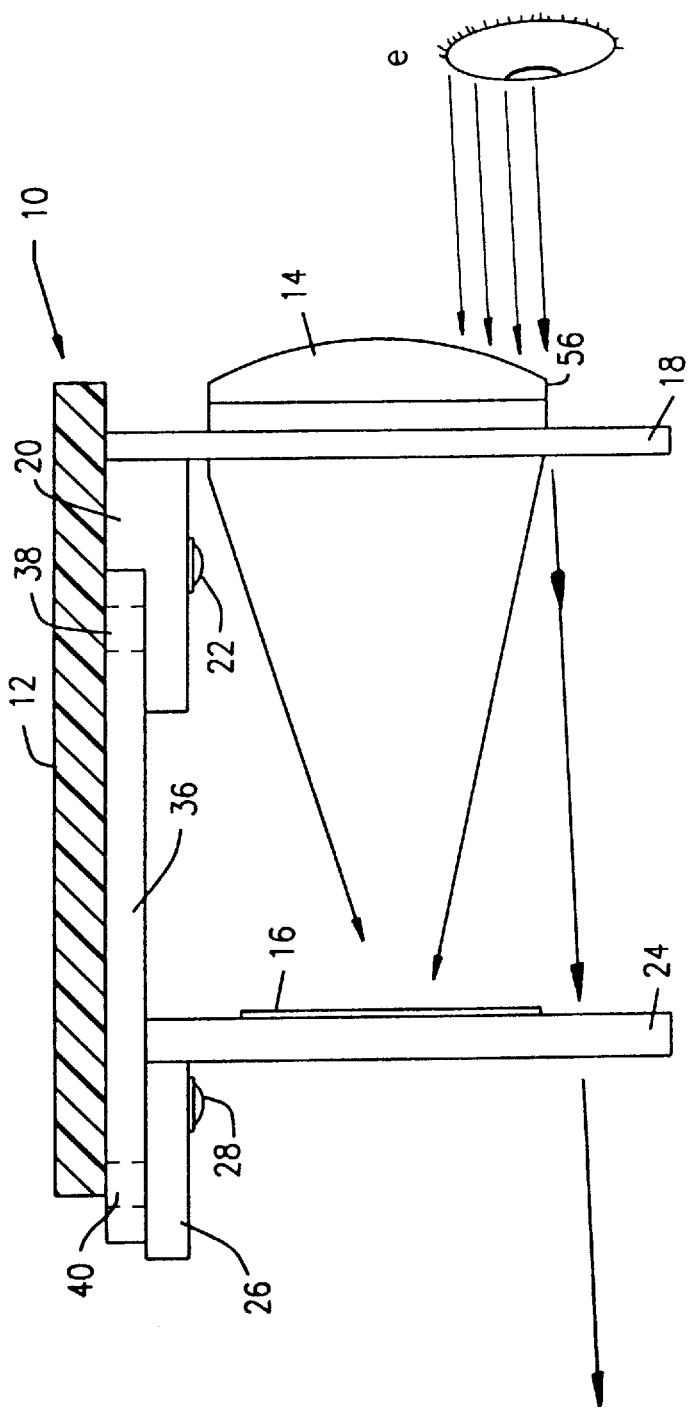
FIG. 3B is a top view of the flip-up range finder with a golfer and a flagpole shown schematically in an alternate mode of use.

The flip-up range finder 10 has been described above in a binocular mode wherein one eye views the flag and the other eye views the range finder. It is recognized that the flip-up range finder 10 can also be used in a monocular mode. The lens 14 has a portion removed therein defining the chord surface 56 of the lens 14; the golfer can simultaneously look at the flag (f) through the two transparent plates 18 and 24, with the same eye that is looking at the range finder index 16, without the image of the flag being altered by the lens 14 or the range finder index 16 as seen in FIG. 3B.

Figure 5:
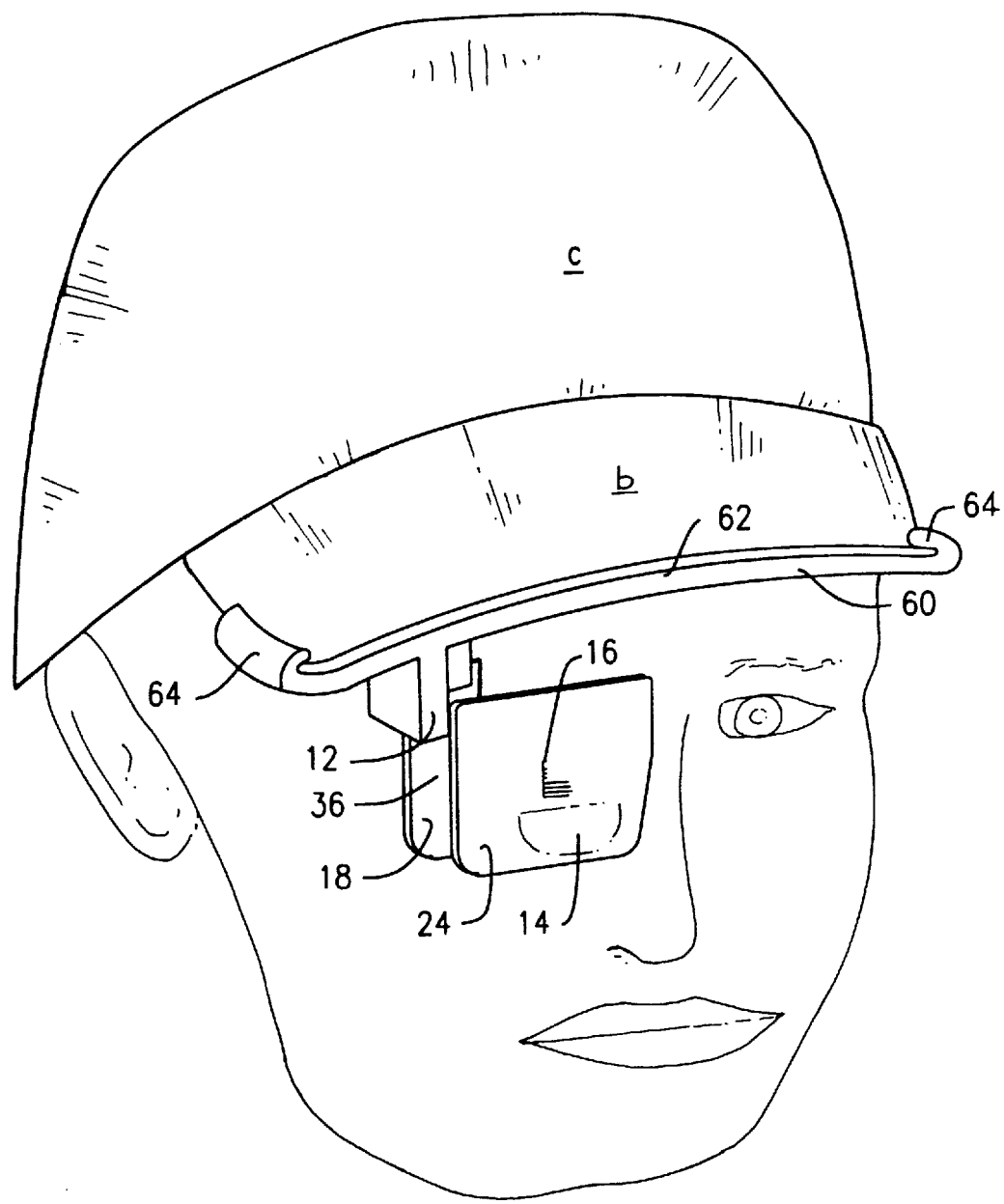
FIG. 5 is a front view of the flip-up range finder attached to the cap in a flipped-down position.

The underside of a bill (b) or visor of a cap (c) with the flip-up range finder 10 attached is shown in FIG. 4. The flip-up range finder 10 has a cap coupling portion 60 to which the base 12 is mounted. The cap coupling portion 60 has a thin shell portion 62 that generally shaped to conform with the bill (b) of the cap (c). The cap coupling portion 60 has a pair of "u" shaped portions 64, as best seen in FIG. 5, that extend to encircle or latch around the edge of the bill (b) of the cap (c) to secure the cap coupling portion 60 to the cap (c). In a preferred embodiment, the cap coupling portion 60 is of a rigid enough plastic to hold its shape and have the bill (b) of the cap (c) conform to the shell portion 62, but flexible enough to allow for ease in coupling the cap coupling portion 60 to the bill (b) of the cap (c). The base 12 is shown integrally with the cap coupling portion 60, however it is recognized that the base could be formed so as to be detachably from the coupling portion 60.

The lens 14 and the range finder index 16 are shown in the retracted position, conveniently out of the way of the golfer so that the golfer can carry on the rest of his or her golf game, such as driving the ball or walking to the ball. To move the flip-up range finder 10 between the retracted position shown and the flipped-down in use position of FIG. 2, the golfer moves the transparent plate 18 which carries the lens 14. The linkage arm 36, which is seen underlying the transparent plate 18, moves the other transparent plate 24 when the first transparent plate 18 is moved.

A generally front view of the cap coupling portion 60 carried by the bill (b) of the cap (c) is shown in FIG. 5. The base projects down from the coupling portion 60. The linkage arm 36 is connected to the second support 26. The transparent plate 24 is located in front of the eye of the golfer. The lens 14 located on the first transparent plate 18 is seen through the transparent plate 24. The range finder index 16 is not magnified from this view, and therefore is shown smaller than in FIG. 3A.

The two "u" shaped portions of the coupling portion 60 encircle the bill (b) of the cap (c). The main portion of the cap coupling portion 60 underlies the front portion of the bill (b) of the cap (c).

The present invention may be embodied in other specific forms without departing from the spirit or essential attributes therefore and, accordingly, references should be made to appended claims, rather than to the foregoing specification, as indicating the scope of the invention. It is recognized that the lens and transparent plate could be molded as one piece. The range finder index could be printed or etched into its associated transparent plate. It is also recognized that the base could be detachable such that the flip-up range finder can mounted in front of the other eye by flipping the cap coupling portion around and reattaching the base or other technique. It is recognized that other style lens maybe used and it may be preferable to use other lens and multiple flip-up lens when used as a monocular.

I claim:

1. A range finder comprising:

a base;

a lens pivotally carried by the base;

a index for viewing the lens, the index pivotally carried by the base; and a linkage bar interposed between the lens and the index such that both the lens and index move in unison from a retracted position to a flipped-down, in use position.

2. A range finder as in claim 1 further comprises a pair of supports, the lens carried by one of the supports, the index carried by the other support, the first support pivotally mounted to the base at a first pivot point, the second support pivotally mounted to the base at a second pivot point, the linkage bar pivotally connected to each support at a third pivot point and a fourth pivot point respectively.

3. A range finder as in claim 2 further comprises a pair of transparent plates wherein one of the plates is interposed between the lens and the first support, and the other plate is interposed between the index and the second support.

4. A range finder as in claim 2 wherein one of the supports has a stop portion for limiting the movement of the linkage bar in one direction and the other of the supports has a stop portion for limiting the movement of the linkage bar in the other direction.

5. A range finder for a cap, the range finder comprising:

a cap mounting means for coupling with a cap;

a base carried by the cap mounting means;

a lens pivotally carried by the base;

a index for viewing the lens, the index pivotally carried by the base; and a linkage bar interposed between the lens and the index such that both the lens and index move in unison from a retracted position to a flipped down, in use position.

6. A range finder for a cap as in claim 5 wherein the cap mounting means is a cap coupling portion having a thin shell portion adapted to conform with the cap and a pair of "u" shaped portions for hooking around an edge of the cap.

7. A range finder as in claim 6 further comprises a pair of supports and a pair of plates, the lens carried by the first plate, the first plate rigidity carried by the first support which is pivotally mounted to the base at a first pivot point, the index carried by the second plate, the second plate rigidly carried by the second support which is pivotally mounted to the base at a second pivot point, the linkage bar pivotally connected to each support at a third pivot point and a fourth pivot point respectively.

8. A range finder as in claim 7 wherein one of the supports has a stop portion for limiting the movement of the linkage bar in one direction and the other of the supports has a stop portion for limiting the movement of the linkage bar in the other direction a mounting portion carried by the cap mounting device.

9. A range finder for a cap for determining the distance to a golf flag, the range finder comprising:

a cap mounting means for coupling with a cap;

a base carried by the cap mounting means;

a first support pivotally mounted to the base at a first pivot point;

a lens carried by the first support;

a second support pivotally mounted to the base at a second pivot point;

a flag pole index for viewing through the lens, the index pivotally carried by the second support; and a linkage bar pivotally mounted at a third pivot point to the first support and pivotally mounted at a four pivot point to the second support such that both the lens and index move in unison from a retracted position to a flipped down, in use position.

10. A range finder for a cap as in claim 9 wherein the cap mounting means is a cap coupling portion having a thin shell portion adapted to conform with the cap and a pair of "u" shaped portions for hooking around an edge of the cap.

11. A range finder for a cap as in claim 9 wherein one of the supports has a stop portion for limiting the movement of the linkage bar in one direction and the other of the supports has a stop portion for limiting the movement of the linkage bar in the other direction.

12. A range finder for a cap as in claim 9 further comprises a pair of plates, the lens carried by the first plate which is rigidity carried by the first support, and the index carried by the second plate which is rigidity carried by the second support.

13. A range finder for a cap as in claim 12 wherein the plate the flag pole index is mounted to is transparent.

14. A range finder for a cap as in claim 9 wherein the lens is a plano-convex lens.

15. A range finder for a cap as in claim 14 wherein lens has a chord segment defining a non-lens area for viewing the flag without the lens.

16. A method of determining the distance between a golfer and a flag on a golf course, comprising the steps of:

pivotally mounting a collimator lens separated from a flag pole index on a golfer's cap such that said lens and index can be pivoted in front of one eye of a golfer in a first mode and away from the eye of said golfer in a second mode whereby said golfer can selectively pivot said lens and flag pole index in said first or second mode;

wearing said cap and selecting said first mode;

viewing said golf flag via said lens and flag pole index in said first mode to enable said golfer to align said flag pole index with said flag via said lens and index;

reading the distance to said flag via said index in said first mode.

17. A method of determining a distance as in claim 16 further comprises the steps of flipping down lens and the index concurrently by flipping down the lens prior to viewing whereby the index is coupled to the lens by a linkage bar, and flipping up lens and the index after viewing to a retracted position.

18. A method of determining a distance as in claim 16 wherein the step of viewing the flag is in a binocular mode with one of the golfer's eyes viewing the range finder and the golfer's other eye viewing the flag.

19. A method of determining a distance as in claim 16 wherein the step of viewing the flag is in a monocular mode with one of the golfer's eyes viewing both the range finder and the flag, the flag being viewed through a non-lens portion of a plate which carries the lens.

* * * * *